United States Patent
Kodama et al.

(10) Patent No.: US 8,885,293 B2
(45) Date of Patent: Nov. 11, 2014

(54) ROTATING DEVICE AND MANUFACTURING METHOD THEREOF

(71) Applicant: Samsung Electro-Mechanics Japan Advanced Technology Co., Ltd., Fujieda (JP)

(72) Inventors: Mitsuo Kodama, Fujieda (JP); Taketo Nonaka, Fujieda (JP); Shuji Tsurusako, Fujieda (JP)

(73) Assignee: Samsung Electro-Mechanics Japan Advanced Tedhnology Co., Ltd., Fujieda, Shizuoka Prefecture (JP)

( * ) Notice: Subject to any disclaimer, the term of this patent is extended or adjusted under 35 U.S.C. 154(b) by 0 days.

(21) Appl. No.: 13/866,641

(22) Filed: Apr. 19, 2013

(65) Prior Publication Data

US 2013/0279043 A1 Oct. 24, 2013

(30) Foreign Application Priority Data

Apr. 23, 2012 (JP) .................................. 2012-097460

(51) Int. Cl.
*G11B 19/20* (2006.01)
(52) U.S. Cl.
USPC ..................................................... 360/99.08
(58) Field of Classification Search
USPC ..................................................... 360/99.08
See application file for complete search history.

(56) References Cited

U.S. PATENT DOCUMENTS

| 8,107,195 B2 | 1/2012 | Sugiki | |
|---|---|---|---|
| 8,300,355 B2 * | 10/2012 | Yang | 360/99.08 |
| 8,315,012 B2 * | 11/2012 | Himeno et al. | 360/99.08 |
| 8,472,132 B2 * | 6/2013 | Yamada et al. | 360/99.08 |
| 2012/0090163 A1 | 4/2012 | Kodama et al. | |
| 2012/0093446 A1 | 4/2012 | Goto et al. | |
| 2012/0120526 A1 | 5/2012 | Sugiki | |
| 2013/0038967 A1 | 2/2013 | Sugiki | |

FOREIGN PATENT DOCUMENTS

| JP | 2010-261580 A | 11/2010 |
|---|---|---|
| JP | 2012-087867 A | 5/2012 |
| JP | 2012-089200 A | 5/2012 |
| JP | 2012-163203 A | 8/2012 |
| JP | 2012-165627 A | 8/2012 |

* cited by examiner

*Primary Examiner* — Mark Blouin
(74) *Attorney, Agent, or Firm* — Holtz, Holtz, Goodman & Chick PC

(57) ABSTRACT

A rotating device includes a shaft body that includes a lower rod and an upper rod formed with a retainer hole encircling a part of the lower rod and fixing the lower rod, a bearing body including a shaft encircling member that encircles the shaft body, and freely rotatable relative to the shaft body, a radial dynamic pressure generating groove which is provided in either one of the shaft body and the bearing body and which generates dynamic pressure in a radial direction, a thrust dynamic pressure generating groove which is provided in either one of the shaft body and the bearing body and which generates dynamic pressure in a thrust direction, and a lubrication medium present in a gap between the shaft body and the bearing body.

20 Claims, 5 Drawing Sheets

ROTATING DEVICE AND MANUFACTURING METHOD THEREOF

BACKGROUND OF THE INVENTION

1. Field of the Invention

The present invention relates to a rotating device including a shaft body supported in a relatively rotatable manner and a bearing body, and a manufacturing method of the rotating device.

2. Description of the Related Art

Rotating devices like a disk drive device are becoming compact and increasing the capacity thereof, and are built in various electronic devices. Such rotating devices are popularly built in, in particular, a hard disk drive that is a kind of disk drive devices of portable electronic devices, such as a laptop computer and a portable music player. The rotating devices like the disk drive device built in such portable electronic devices need improved shock resistance and vibration resistance (hereinafter, referred to as "shock resistance characteristic, etc.,") so as to withstand a shock due to falling and a vibration when carried in comparison with the rotating devices built in stationary electronic devices like a desktop computer. Moreover, such rotating devices need thinning and weight saving in comparison with the rotating devices built in the stationary electronic devices like a desktop computer. In general, thinning and improvement of the shock resistance characteristic, etc., are in a trade-off relationship.

One of the inventors of the present invention proposes a rotating device that is a disk drive device having a fluid dynamic bearing mechanism formed between a shaft body and a bearing body, and having the shaft body including a shaft fixed to a base in, for example, JP 2010-261580 A. According to the rotating device disclosed in JP 2010-261580 A, a radial dynamic bearing is formed in a space in the radial direction between the shaft body and the bearing body, and a thrust dynamic bearing is formed therebetween in a space in the axial direction.

For the rotating device like the disk drive device disclosed in JP 2010-261580 A, in order to make the shock resistance characteristic, etc., improved, there is a demand to demand the rigidity of a thrust dynamic bearing (hereinafter, referred to as a "thrust rigidity"). In order to improve the thrust rigidity, a technique of reducing a gap between a shaft body structuring a thrust bearing and a member of a bearing body in the axial direction is known.

When, however, the gap between the shaft body and the member of the bearing body is reduced, an adverse effect of a manufacturing error in the dimension of components for such a gap relatively increases. Rotating device may be formed with an attempt to reduce the manufacturing errors in the individual components of the shaft body and the bearing body, but in order to do so, manufacturing of such components needs a large amount of labor works, which may result in the reduction of the yield of the manufacturing of the components. Hence, rotating devices are practically designed based on an assumption that the components have manufacturing errors in dimension within a certain range. In the case of such rotating devices, when the gap between the shaft body and the bearing body is too small, the shaft body and the bearing body may contact with each other while the rotating device is rotating, and in the worst case, those components are highly possibly damaged. Hence, there is a tendency that such a gap is designed largely in consideration of the manufacturing error in such a way that the gap between the shaft body and the bearing body does not become excessively small even if the manufacturing error is present. According to such a circumstance, the manufacturing error in the shaft body and the component of the bearing body disturbs the improvement of the thrust rigidity, and is a technical interruption against the improvement of the shock resistance characteristic, etc.

Under such a background circumstance, the inventors of the present invention recognized that it is necessary to suppress an adverse affect of the manufacturing error in the gap between the shaft body and the bearing body in order to improve the shock resistance characteristics, etc., of the rotating device.

The same is true of not only the rotating devices built in portable electronic devices but also electronic devices of other kinds.

The present invention has been made in view of such circumstances, and it is an object of the present invention to provide a technology of improving conventional rotating devices, and suppressing an adverse effect of a manufacturing error in a gap between a shaft body and a bearing body in an axial direction to avoid a reduction of a shock resistance characteristic, etc., of a rotating device.

SUMMARY OF THE INVENTION

A first aspect of the present invention provides a rotating device that includes: a shaft body comprising a lower rod and an upper rod formed with a retainer hole which encircles a part of the lower rod and which fastens the lower rod; a bearing body comprising a shaft encircling member that encircles the shaft body and being freely rotatable relative to the shaft body; a radial dynamic pressure generating groove which is provided in either one of the shaft body and the bearing body and which generates dynamic pressure in a radial direction; a thrust dynamic pressure generating groove which is provided in either one of the shaft body and the bearing body and which generates dynamic pressure in a thrust direction; and a lubrication medium present in a gap between the shaft body and the bearing body.

Another aspect of the present invention provides a method for manufacturing a rotating device. The rotating device includes: a shaft body comprising a lower rod, a lower flange extending outwardly in a radial direction from a side face of the lower rod at one end side, an upper rod formed with a retainer hole encircling a part of the lower rod and fixing the lower rod, and an upper flange extending outwardly in the radial direction from a side face of the upper rod at a side distant from the lower flange in an axial direction; a bearing body comprising a shaft encircling member which is present in a space between the lower flange and the upper flange in the axial direction, encircles the shaft body, and is freely rotatable relative to the shaft body; a radial dynamic pressure generating groove which is provided in either one of the shaft body and the bearing body and which generates dynamic pressure in the radial direction; a thrust dynamic pressure generating groove which is provided in either one of the shaft body and the bearing body and which generates dynamic pressure in a thrust direction; and a lubrication medium present in a gap between the shaft body and the bearing body. The method includes: inspecting a dimension of a play of the shaft encircling member between the upper flange and the lower flange in the axial direction with the shaft encircling member being placed between the upper flange fixed to the upper rod and the lower flange fixed to the lower rod, and the lower rod being inserted in the retainer hole of the upper rod up to a predetermined insertion position; changing the insertion position of the lower rod in the retainer hole of the upper rod in accordance with a desired dimension of a play of the shaft encircling member in the axial direction between the upper flange and the lower flange and the inspected dimension of the play in the axial direction; and fixing the lower rod to the upper rod with the insertion position of the lower rod in the retainer hole being changed.

The other aspect of the present invention provides a method for manufacturing a rotating device. The rotating device includes: a shaft body comprising a lower rod, a lower flange extending outwardly in a radial direction from a side face of the lower rod at one end side, an upper rod formed with a retainer hole encircling a part of the lower rod and fixing the lower rod, and an upper flange extending outwardly in the radial direction from a side face of the upper rod at a side distant from the lower flange in an axial direction; a bearing body comprising a shaft encircling member which is present in a space between the lower flange and the upper flange in the axial direction, encircles the shaft body, and is freely rotatable relative to the shaft body; a radial dynamic pressure generating groove which is provided in either one of the shaft body and the bearing body and which generates dynamic pressure in the radial direction; a thrust dynamic pressure generating groove which is provided in either one of the shaft body and the bearing body and which generates dynamic pressure in a thrust direction; and a lubrication medium present in a gap between the shaft body and the bearing body. The upper flange includes a tapered face which is provided at an outer periphery side face, increases a diameter toward the lower flange, and contacts an air-liquid interface of the lubrication medium. A sloped portion is provided at an end face of the upper flange opposite to the lower flange and inclining from an outer periphery side to an inner periphery side toward the lower flange. The method includes: inspecting a position of the sloped portion by emitting laser light to the sloped portion; and inspecting a position of the air-liquid interface by emitting laser light to the air-liquid interface.

Any combination of the above-explained structural elements and replacement of the structural element and the technical term of the present invention between a method, an apparatus, and a system, etc., are also effective as an embodiment of the present invention.

According to the present invention, it becomes possible to provide a technology of suppressing an adverse effect of a manufacturing error in a gap between a shaft body and a bearing body of a rotating device in the axial direction including the shaft body and the bearing body to avoid a reduction of a shock resistance characteristic, etc., of the rotating device.

DETAILED DESCRIPTION OF THE PREFERRED EMBODIMENTS

Figure 1:
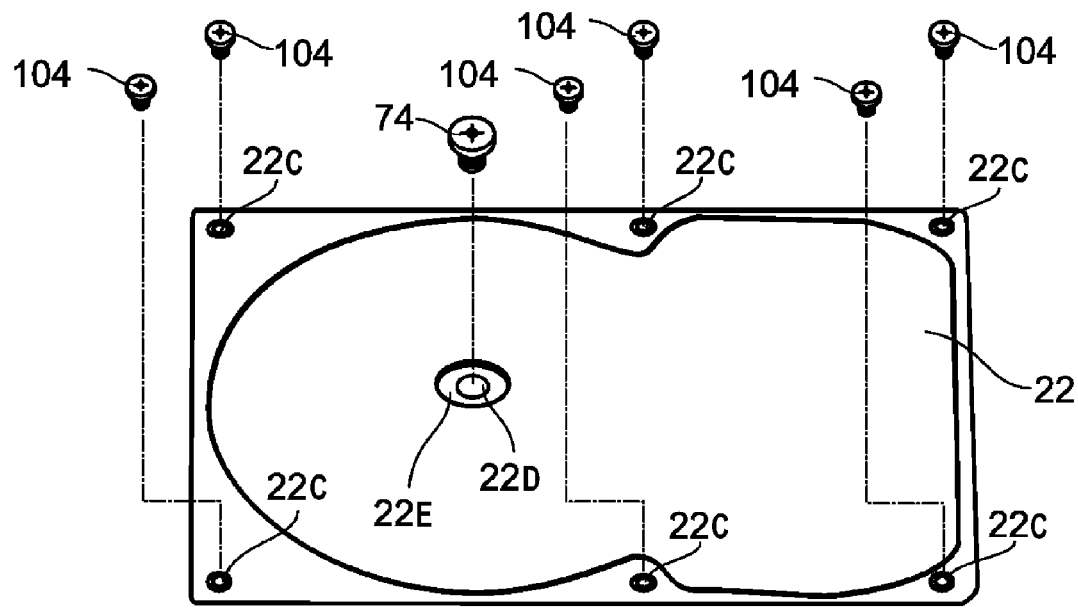
FIG. 1 is an exploded perspective view illustrating a rotating device according to an embodiment of the present invention.
Figure 1:
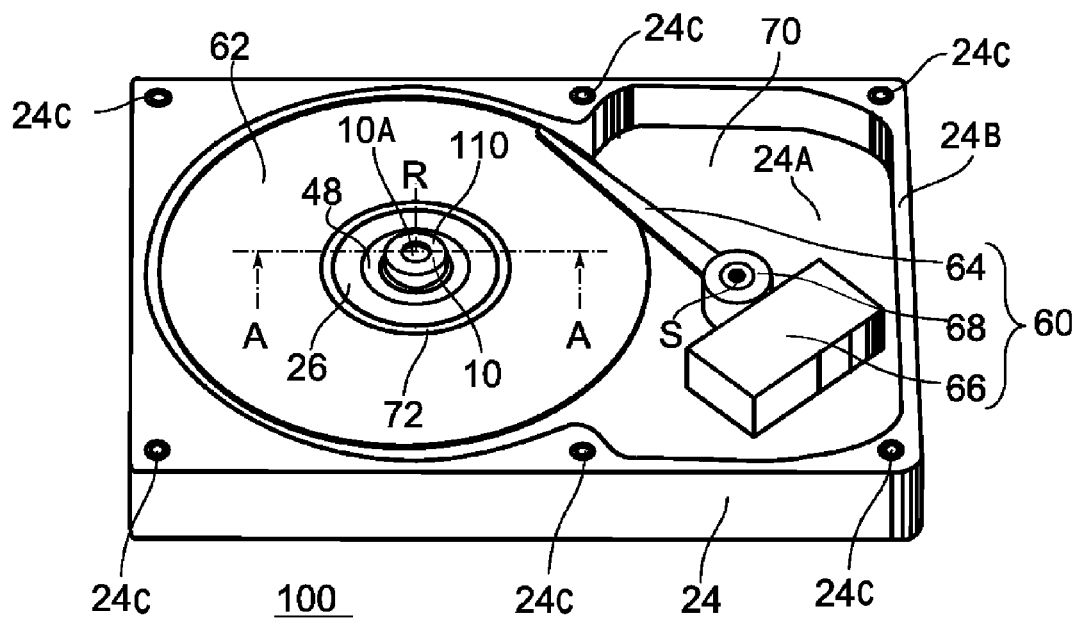

An explanation will be given of a preferred embodiment of the present invention with reference to the accompanying drawings. The same or similar structural element or member will be denoted by the same reference numeral throughout the figures, and the duplicated explanation will be omitted accordingly. The dimension of each member in the figure is enlarged or reduced as needed to facilitate understanding for the present invention. A part of the member not important to explain an embodiment of the present invention in the figure will be also omitted.

A rotating device of an embodiment is suitably used as, for example, a disk drive device like a hard disk drive on which magnetic recording disks for magnetically recording data are to be mounted and which rotates and drives the magnetic recording disks. The rotating device is suitably used as, in particular, a fixed-shaft disk drive device which has a shaft fixed to a base, and which causes a hub to rotate relative to the shaft. The rotating device of this type includes, for example, a rotating body that is attached to a stationary body via bearing means in a freely rotatable manner. The rotating body includes, for example, mounting means for mounting a drive-target medium like a magnetic recording disk. The bearing means includes, for example, radial bearing means formed at either one of the stationary body and the rotating body. The bearing means also includes, for example, thrust bearing means formed at either one of the stationary body and the rotating body. The thrust bearing means is, for example, located outwardly of the radial bearing means in the radial direction. For example, the radial bearing means and the thrust bearing means may generate dynamic pressure to a lubrication medium. The radial bearing means and the thrust bearing means may contain, for example, a lubrication fluid. The rotating device may include, for example, rotating-driving means for giving rotational torque to the rotating body. The rotating-driving means may be, for example, a brushless spindle motor. The rotating-driving means may also include, for example, a coil and a magnet.

Embodiment

FIG. 1 is a perspective view showing a rotating device 100 according to an embodiment of the present invention. FIG. 1 shows a condition in which a top cover 22 is detached to facilitate understanding for the present invention. A rotating device 100 includes a base 24, an upper shaft member 110, a hub 26, a magnetic recording disk 62, a data reader/writer 60, the top cover 22, a center screw 74, and for example, six peripheral screws 104.

In the following explanation, a side where the hub 26 is mounted relative to the base 24 is defined as an upper side. Moreover, a direction along the rotational axis R of a rotating body, an arbitrary direction traversing the rotational axis R on a plane orthogonal to the rotational axis R, and an arbitrary direction on such a plane are referred to as an axial direction, a radial direction, and a planar direction, respectively, in some cases.

The magnetic recording disk 62 is a 2.5-inch magnetic recording disk having a diameter of 65 mm and formed of a glass, and a diameter of a center hole thereof is 20 mm. If the magnetic recording disk 62 is made thin, the rigidity thereof decreases, and is warped when polished at the time of the manufacturing of the rotating device 100, thereby reducing the processing flatness. Conversely, if the magnetic recording disk 62 is made thick, the weight increases. Regarding the magnetic recording disk 62, it is proven if the thickness is within a range at least from 0.5 mm to 1.25 mm, the rigidity and the weight are practical. In this embodiment, the magnetic recording disk 62 has a thickness of from 0.7 mm to 0.9 mm, which suppresses a decrease of the processing flatness, thereby suppressing a reduction of the recording density. For example, a magnetic recording disk 62 is to be mounted on the hub 26, and is rotated together with the rotation of the hub 26. The magnetic recording disk 62 is fastened to the hub 26 by a clamper 72.

The base 24 is formed by die-cast molding of an aluminum alloy. The base 24 has a bottom plate 24A that forms the bottom of the rotating device 100, and an outer periphery wall 24B that is formed along the outer periphery of the bottom plate 24A so as to surround the region where the magnetic recording disk 62 is mounted. For example, six screw holes 24C are formed in the upper face of the outer periphery wall 24B.

The data reader/writer 60 includes a recording/playing head (unillustrated), a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the base 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover recess 22E, and a center hole 22D provided at the center of the cover recess 22E. The top cover 22 is formed by, for example, pressing an aluminum plate or an iron-steel plate into a predetermined shape. A surface processing like plating may be applied on the top cover 22 in order to suppress corrosion. The top cover 22 is fixed to the upper face of the outer periphery wall 24B of the base 24 by, for example, the six peripheral screws 104. The six peripheral screws 104 correspond to the six screw through-holes 22C and the six screw holes 24C, respectively. In particular, the top cover 22 and the upper face of the outer periphery wall 24B are fixed with each other so as to suppress a leak into the interior of the rotating device 100 from the joined portion of the top cover 22 and the upper face of the outer periphery wall 24B. The interior of the rotating device 100 is, more specifically, a clean space 70 surrounded by the bottom plate 24A of the base 24, the outer periphery wall 24B of the base 24, and the top cover 22. This clean space 70 is designed so as to be fully sealed, i.e., so as not to have a leak-in from the exterior and a leak-out to the exterior. The clean space 70 is filled with clean air having particles eliminated. Hence, foreign materials like the particles are prevented from sticking to the magnetic recording disk 62, thereby improving the reliability of the operation of the rotating device 100. The center screw 74 corresponds to a retainer hole 10A of the upper shaft member 110. The top cover 22 is joined with an upper rod 10 to be discussed later of the upper shaft member 110 by letting the center screw 74 to pass all the way through the center hole 22D and screwing and engaging the center screw 74 into the retainer hole 10A.

Figure 2:
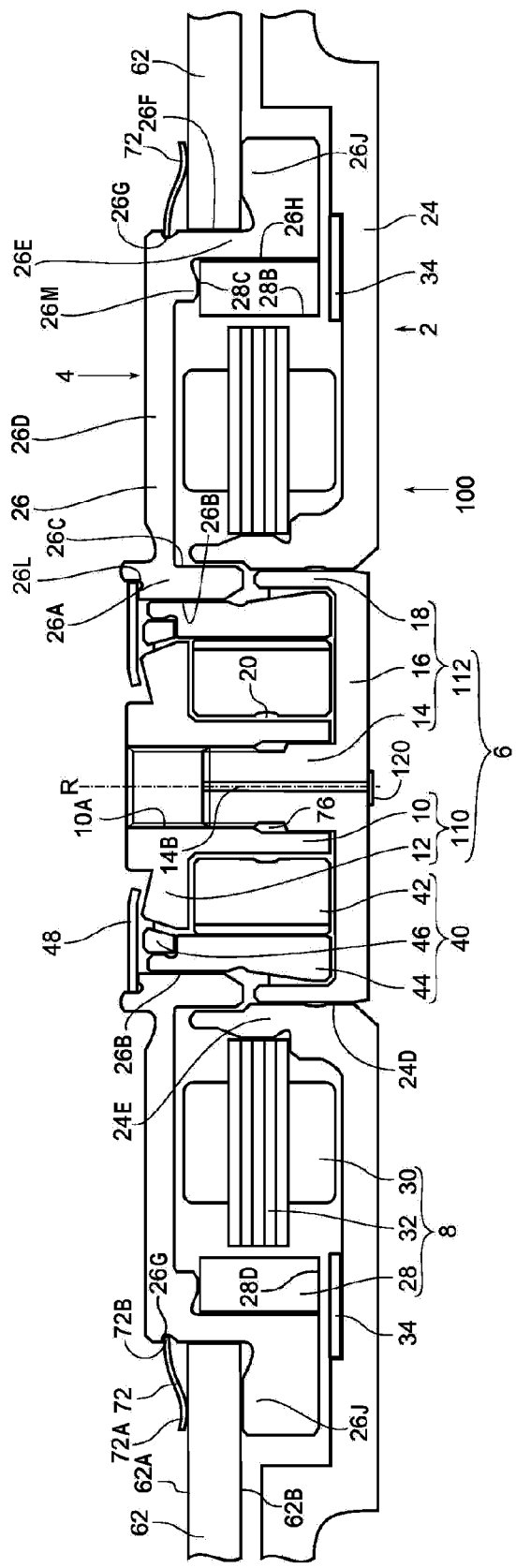
FIG. 2 is a cross-sectional view taken along a line A-A in FIG. 1.
Figure 3:
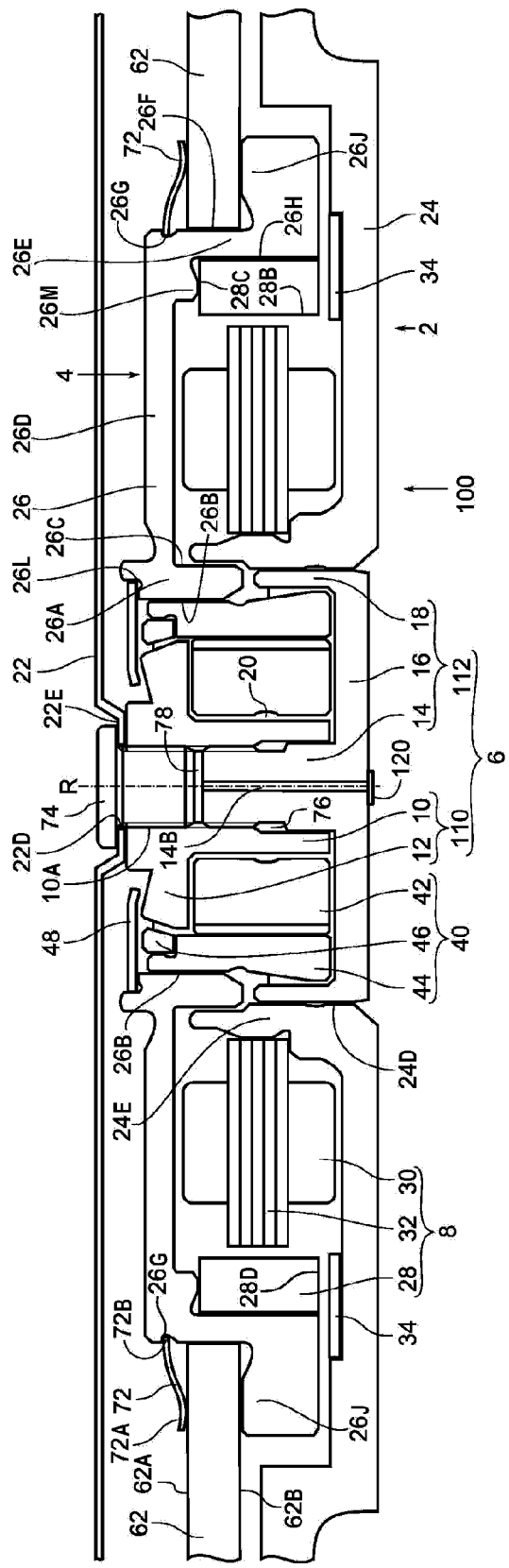
FIG. 3 is a cross-sectional view corresponding to FIG. 2 and illustrating a condition in which a top cover is attached.

FIG. 2 is a cross-sectional view taken along a line A-A in FIG. 1. FIG. 3 is a cross-sectional view corresponding to FIG. 2 and illustrating a condition in which the top cover 22 is attached. FIGS. 2 and 3 are symmetrical along the rotational axis R, and the notation of a reference numeral for the same member in the right or left will be omitted in some cases.

With reference to FIG. 2, a stationary body 2 includes a shaft body 6, the stator core 32, coils 30, and further a magnetic ring 34. The shaft body 6 includes the upper shaft member 110 having the upper rod 10 and an upper flange 12, and a lower shaft member 112 having a lower rod 14, a lower flange 16, and a flange encircling member 18.

A rotating body 4 includes a bearing body 40, a cap 48, and further a cylindrical magnet 28. The bearing body 40 includes a sleeve 42, a cylinder part 44, and a ring member 46. The rotating body 4 and the stationary body 2 have a lubricant 20 that is a lubrication medium continuously present in some spaces between the shaft body 6 and the bearing body 40. The sleeve 42 and the cylinder part 44 are members encircling the shaft body 6, and may be denoted as a shaft encircling member in some cases.

Moreover, the shaft body 6, the bearing body 40, and the lubricant 20 configure a fluid bearing unit together with a first dynamic pressure generating groove 50, a second dynamic pressure generating groove 52, a third dynamic pressure generating groove 54, and a fourth dynamic pressure generating groove 56 to be discussed later.

The base 24 has an opening 24D around the rotational axis R of the rotating body 4, and a cylindrical protrusion 24E that encircles the opening 24D. The protrusion 24E protrudes toward the hub 26 from the upper face of the base 24.

The stator core 32 has an annular part and, for example, twelve salient poles running outwardly in the radial direction from the annular part, and is fixed to, for example, the outer periphery of the protrusion 24E at the upper-face side of the base 24. The stator core 32 may be joined with the base 24 by, for example, press-fitting, bonding or a combination thereof. The stator core 32 is formed by, for example laminating five electromagnetic steel plates each with a thickness of 0.2 mm and integrating those by caulking. A skin layer is provided on the surface of the stator core 32. For example, an insulative coating, such as electrodeposition coating or powder coating, is applied to the surface of the stator core 32. The coil 30 is wound around each salient pole of the stator core 32. When, for example, three-phase drive currents of a substantially sinusoidal wave are caused to flow through the coils 30, field magnetic fields are produced along the respective salient poles.

The magnetic ring 34 is a hollow ring that is thin in the axial direction, and has the inner periphery thereof disposed coaxially with the magnet 28 along the rotational axis R. The magnetic ring 34 is firmly fixed to the upper face of the base 24 by, for example, bonding, caulking, or a combination thereof. The magnetic ring 34 is formed by, for example, pressing an iron-steel plate with soft magnetism. The magnetic ring 34 has an area facing a lower face 28D of the magnet 28 in the axial direction in a non-contact manner, and provides downward suction force to the magnet 28. This configuration suppresses an uplifting of the rotating body 4 in the axial direction.

The hub 26 is provided with a first hollow annular part 26A, a disk part 26D extending outwardly in the radial direction from an outer periphery 26C of the first annular part 26A, a second annular part 26E extending downwardly in the axial direction from the outer periphery of the disk part 26D, and a mount part 26J extending outwardly in the radial direction from a lower outer periphery 26F of the second annular part 26E, and is formed in a substantially cup shape. That is, the second annular part 26E protrudes from the mount part 26J, and the mounting part 26J is provided outwardly from the second annular part 26E in the radial direction. The first annular part 26A, the disc part 26D, the second annular part 26E and the mounting part 26J are coaxial one another along the rotational axis R. The first annular part 26A, the disk part 26D, the second annular part 26E, and the mounting part 26J are formed together. Any one of such parts may be separately formed and joined with other parts. The hub 26 is formed of an iron-steel material like SUS 430F with soft magnetism. The inner periphery of the center hole of the doughnut and annular magnetic recording disk 62 is fitted to the outer periphery 26F of the second annular part 26E of the hub 26. The magnetic recording disk 62 is mounted on the upper face of the mounting part 26J of the hub 26. A circumferential groove 26G concaved inwardly in the radial direction is provided as an example clamper catcher in the outer periphery 26F of the second annular part 26E. The circumferential groove 26G is located above the upper face of the magnetic recording disk 62 in the axial direction when the magnetic recording disk 62 is mounted on the hub 26. A protrusion 26M protruding downwardly in the axial direction is present on the lower face of the outer periphery of the disk part 26D. A recess 26L concaved outwardly in the radial direction is circularly formed in the upper part of an inner periphery 26B of the first annular part 26A.

The clamper 72 is, for example, a spring washer which is thin in the axial direction, is formed in a hollow ring shape, and has an inner periphery formed in a petal shape. The clamper 72 is formed of a material with elasticity like a stainless-steel sheet. The clamper 72 is compressed in the axial direction, has an inner periphery 72B fitted in and engaged with the circumferential groove 26G, and also has an outer periphery 72A abutting the magnetic recording disk 62. As a result, the magnetic recording disk 62 is held between the clamper 72 engaged with the circumferential groove 26G and the mounting part 26J, thereby being fastened to the hub 26.

The magnet 28 is in a hollow ring shape, and has an outer circumferential surface fastened to an inner circumferential surface 26H of the hub 26 by, for example, bonding. An upper face 28C contacts the protrusion 26M of the hub 26. 16 drive magnetic poles are provided at an inner circumferential surface 28B in the circumferential direction by magnetization. The magnet 28 is formed of a material containing, for example, neodymium, iron, or boron. The magnet 28 may contain a resin at a predetermined percentage. The magnet 28 may be formed of a material containing a ferrite magnetic material, or may be formed by laminating a layer containing a ferrite magnetic material and another layer containing a rare-earth material like neodymium. A skin layer is provided on the surface of the magnetic layer of the magnet 28. For example, electrodeposition coating or spray painting is applied on the surface of the magnet 28. The provided skin layer suppresses an oxidization of the magnet, or suppresses a peeling of the surface of the magnet.

Figure 4:
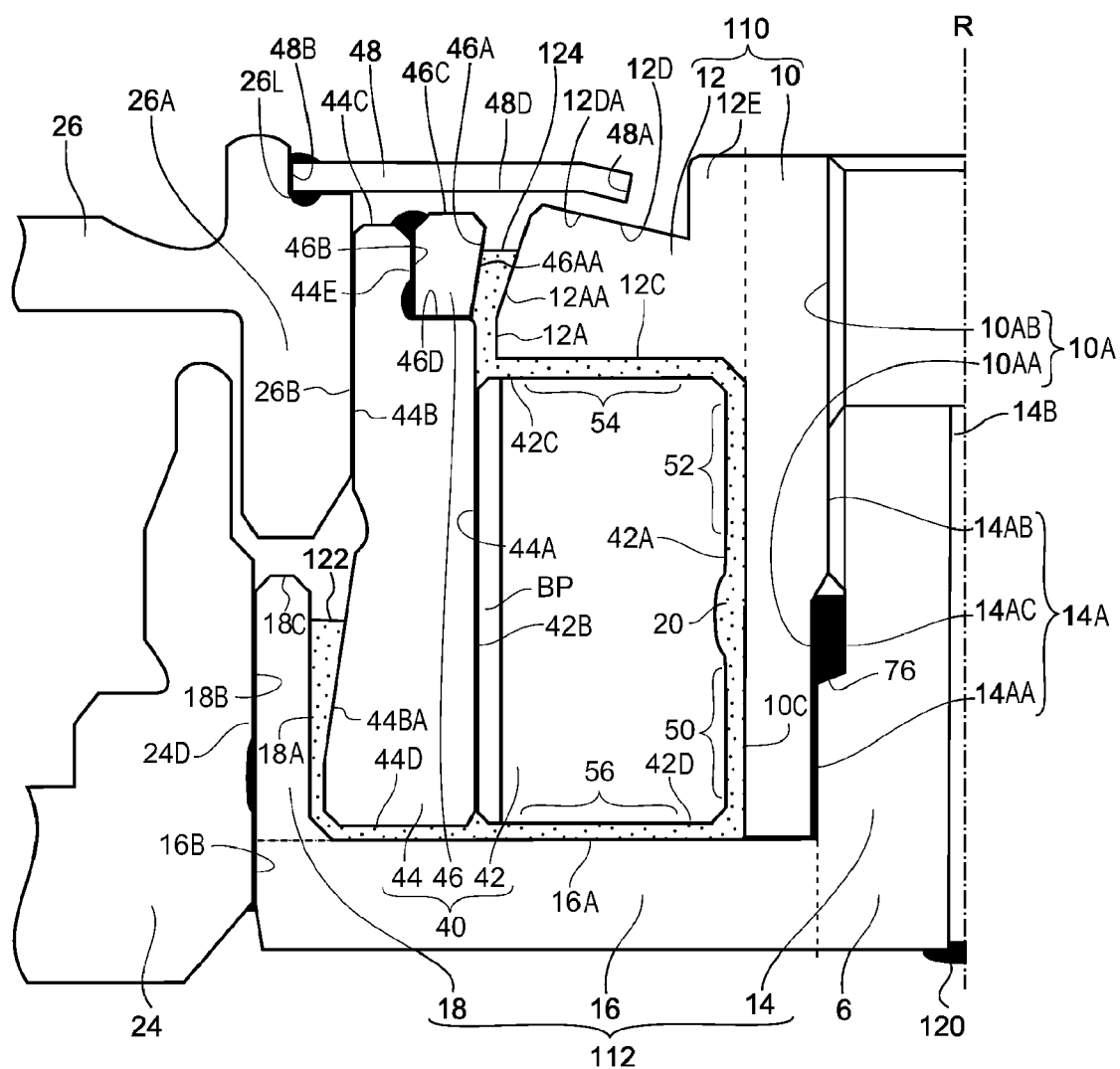
FIG. 4 is an enlarged cross-sectional view illustrating a region where a lubricant is present in FIG. 2 in an enlarged manner.

An explanation will be given of a fluid bearing unit and the circumference thereof with reference to FIG. 4. FIG. 4 is an enlarged cross-sectional view illustrating the circumference of an area where the lubricant 20 is present in FIG. 2 in an enlarged manner. FIG. 4 shows only the left part relative to the rotational axis R.

The lower shaft member 112 includes the rod-like lower rod 14 having a passage 14B formed in the center thereof, the lower flange 16 in the disk shape extending outwardly in the radial direction from the lower end of an outer periphery 14A of the lower rod 14, and the flange encircling member 18 in the cylindrical shape protruding upwardly in the radial direction from the outer periphery edge of the lower flange 16. The lower rod 14 has, at the outer periphery 14A thereof, a male screw 14AB, a small-diameter part 14AC with a smaller diameter than that of the male screw 14AB, and a large-diameter part 14AA with a larger diameter than that of the male screw 14AB in the axial direction in this order. The small-diameter part 14AC is cylindrical and has an outer diameter formed to be smaller than the core diameter of the male screw 14AB. Moreover, the large-diameter part 14AA is also cylindrical, and has an outer diameter formed to be larger than the outer diameter of the male screw 14AB. The male screw 14AB has the outer diameter substantially equal to the outer diameter of the threaded part of the center screw 74 with the measurement error being excluded. For example, the lower shaft member 112 has the lower rod 14, the lower flange 16, and the flange encircling member 18 formed together. In this case, the manufacturing error of the lower shaft member 112 can be reduced, which eliminates a process of joining those pieces. Moreover, a deformation of the lower shaft member 112 due to shock load can be prevented. The lower shaft member 112 is formed by, for example, cutting and machining a metallic material like SUS 303. The lower shaft member 112 may be formed of other materials like a resin and formed by other techniques like pressing and molding.

The lower shaft member 112 is fixed to the base 24 by, for example, bonding an outer periphery 18B of the flange encircling member 18 and an outer periphery 16B of the lower flange 16 to the inner periphery of the opening 24D. The lower rod 14 has a passage cover 120 that covers the lower end of the passage 14B. The passage cover 120 is formed by, for example, applying a sealant to the lower end of the passage 14B and the periphery of the edge thereof, and letting the sealant to be dried. The passage cover 120 may be a sheet formed of, for example, a metallic material or a resin material bonded and fixed. The flange encircling member 18 has an upper end 18C located at, for example, a region where a first dynamic pressure generating groove 50 to be discussed later is formed or above such a region in the axial direction. According to this structure, the volume of a space between an inner periphery 18A of the flange encircling member 18 and the outer periphery of the bearing body 40 to be discussed later can be increased, thereby increasing the amount of the lubricant 20 retainable. By retaining more lubricant 20, the possibility of the occurrence of a failure due to the lack of the lubricant 20 can be prevented.

The upper shaft member 110 includes the upper rod 10 in a rod shape having the retainer hole 10A formed in the center thereof and retaining the lower rod 14, and the upper flange 12 in a substantially disk shape extending outwardly in the radial direction from the upper end of an outer periphery 10C of the upper rod 10. The retainer hole 10A passes through the upper rod 10 in the axial direction. The retainer hole 10A may be a sac-like hole. The retainer hole 10A includes a female screw 10AB where a female thread is formed, and a large-diameter part 10AA formed under the female screw 10AB and having a larger diameter than that of the female screw 10AB. The large-diameter part 10AA has an inner periphery formed in a cylindrical shape, and may have an internal diameter larger than the core diameter of the female screw 10AB. For example, when the inner diameter of the large-diameter part 10AA is substantially equal to the outer diameter of the large-diameter part 14AA of the lower rod 14, the assembling precision of the upper rod 10 and the lower rod 14 can be improved. For example, the upper shaft member 110 may have the upper flange 12 formed separately from the upper rod 10 and joined therewith later. The upper shaft member 110 is formed by, for example, cutting and machining an iron-steel material like SUS 420J2. The upper shaft member 110 may be quenched in order to increase the hardness. In order to improve the dimensional precision of the upper shaft member 110, the outer periphery 10C of the upper rod 10 and a lower face 12C of the upper flange 12 may be polished. Moreover, the upper shaft member 110 may be formed of other materials like a resin and formed through other techniques like pressing and molding.

The lower rod 14 is encircled by the retainer hole 10A of the upper rod 10 and is fixed thereto. More specifically, the lower rod 14 is joined with the upper rod 10 by engaging the male screw 14AB of the lower rod 14 with the female screw 10AB of the retainer hole 10A of the upper rod 10. The sealant 76 is present in a space between the lower rod 14 and the upper rod 10 in the radial direction. Moreover, the sealant 76 may be present in a space between the upper rod 10 and the lower rod 14 in the axial direction. Furthermore, the sealant 76 may be further present in a space between the female screw 10AB of the upper rod 10 and the male screw 14AB of the lower rod 14 in the radial direction, a space between the large-diameter part 10AA of the upper rod 10 and the small-diameter part 14AC of the lower rod 14 in the radial direction, and a space between the large-diameter part 10AA of the upper rod 10 and the large-diameter part 14AA of the lower rod 14 in the radial direction, respectively. The sealant 76 suppresses a leak-out of the lubricant 20, or improves the joining strength between the lower rod 14 and the upper rod 10. The sealant 76 is, for example, an anaerobic bond.

Figure 5:
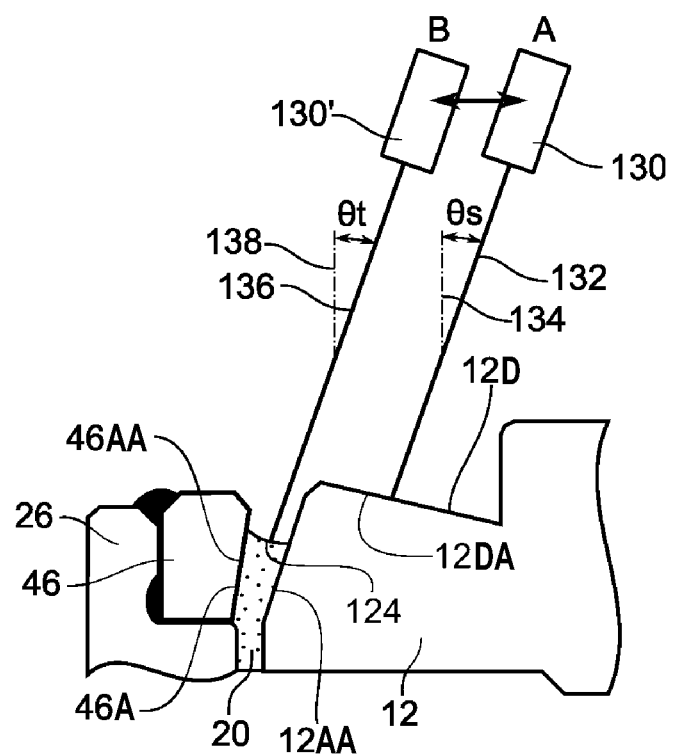
FIG. 5 is an explanatory diagram illustrating a manufacturing method of the rotating device according to the embodiment.

The upper flange 12 has a tapered face 12AA formed on an outer periphery 12A and increasing the distance from the rotational axis R in the radial direction as becoming closer to the base 24. The upper flange 12 has the lower face 12C facing an upper face 42C of the sleeve 42 of the bearing body 40 to be discussed later via a clearance in the axial direction. The upper flange 12 has a flange end face 12D that extends inwardly in the radial direction from the upper end of the outer periphery 12A, and a raised part 12E raised upwardly in the axial direction from the inner end of the flange end face 12D in a substantially cylindrical shape. The flange end face 12D has a sloped portion 12DA having a distance from the lower flange 16 in the axial direction which becomes small as becoming closer to the rotational axis R. An angle θs between a straight line 132 orthogonal to the sloped portion 12DA and a straight line 134 parallel to the rotational axis R is set to be substantially equal to an angle θt between a straight line 136 along the tapered face 12AA and a straight line 138 parallel to the rotational axis R (see FIG. 5).

The bearing body 40 includes the substantially cylindrical sleeve 42 that encircles the upper rod 10, a substantially cylindrical cylinder part 44 that encircles the sleeve 42 and joined therewith, and a ring member 46 in a ring shape joined with the upper end of the cylinder part 44. The bearing body 40 has the sleeve 42 encircling the upper rod 10 via a clearance, and thus rotatable. The bearing body 40 has the sleeve 42 present between the upper flange 12 and the lower flange 16 via clearances. The bearing body 40 has the cylinder part 44 encircling the hub 26 and fixed thereto. The bearing body 40 has the cylinder part 44 encircled by the flange encircling member 18 of the lower shaft member 112 via a clearance. According to such a structure, the hub 26 is supported in a freely rotatable manner to the base 24.

The sleeve 42 and the cylinder part 44 are each formed by, for example, cutting a metallic material like brass, and applying electroless nickel plating on the surface of the cut piece. The sleeve 42 and the cylinder part 44 may be formed of other materials like a stainless-steel material. The sleeve 42 is joined with the cylinder part 44 by, for example, interference fitting like press-fitting, or bonding. The sleeve 42 and the cylinder part 44 may be subjected to plating after joined with each other. In this case, a reduction of the joining strength due to the plating layer present between the joined faces can be prevented. The sleeve 42 and the cylinder part 44 may be subjected to finishing after joined with each other. In this case, a deformation occurred at the time of joining can be corrected. The sleeve 42 and the cylinder part 44 may be formed together. In this case, the assembling precision of the sleeve 42 and the cylinder part 44 is improved.

The sleeve 42 is hollow and in a substantially cylindrical shape, and has an inner periphery 42A, an outer periphery 42B, the upper face 42C, and a lower face 42D. The sleeve 42 has the inner periphery 42A encircling the upper rod 10 via a clearance. The inner periphery 42A of the sleeve 42 has regions which face the outer periphery 10C of the upper rod 10 in the radial direction and where a first and second dynamic pressure generating grooves 50 and 52 are formed to produce radial dynamic pressure. The second dynamic pressure generating groove 52 is provided above the first dynamic pressure generating groove 50 and distant therefrom. The first and second dynamic pressure generating grooves 50 and 52 may be provided in the outer periphery 10C of the upper rod 10 instead of the sleeve 42.

In order to generate thrust dynamic pressure, a third dynamic pressure generating groove 54 is provided in the region of the upper face 42C of the sleeve 42 facing the upper flange 12 in the axial direction. The third dynamic pressure generating groove 54 may be provided in the region of the lower face 12C of the upper flange 12 facing the sleeve 42 in the axial direction instead of the sleeve 42. In order to generate thrust dynamic pressure, also, a fourth dynamic pressure generating groove 56 is provided in the region of the lower face 42D of the sleeve 42 facing the lower flange 16 in the axial direction. The fourth dynamic pressure generating groove 56 may be provided in the region of the upper face 16A of the lower flange 16 facing the sleeve 42 in the axial direction instead of the sleeve 42.

The first and second dynamic pressure generating grooves 50 and 52 are formed in, for example, a herringbone shape. The first and second dynamic pressure generating grooves 50 and 52 may be formed in other shapes like a spiral shape. The third and fourth dynamic pressure generating grooves 54 and 56 are formed in, for example, a herringbone shape. The third and fourth dynamic pressure generating grooves 54 and 56 may be formed in other shapes like a spiral shape. The first, second, third, and fourth dynamic pressure generating grooves 50, 52, 54, and 56 are formed by, for example, pressing, ball rolling, etching, or cutting. Respective dynamic pressure generating grooves may be formed by different manufacturing techniques.

The cylinder part 44 is hollow and in a substantially cylindrical shape, and includes an inner periphery 44A, an outer periphery 44B, an upper face 44C, a lower face 44D, and a recess 44E circumferentially provided in the upper end of the inner periphery 44A so as to be concaved outwardly in the radial direction. The inner periphery 44A is joined with the sleeve 42. The upper portion of the outer periphery 44B is joined with the inner periphery 26B of the first annular part 26A of the hub 26. The lower portion of the region of the outer periphery 44B joined with the hub 26 is encircled by the flange encircling member 18 via a clearance. The outer periphery 44B has an inclined face 44BA that reduces its radius as becoming closer to the upper end of the inner periphery 18A of the flange encircling member 18 in a region facing therewith in the radial direction. The clearance between the inclined face 44BA and the inner periphery 18A in the radial direction defines a tapered space gradually expanding as it goes upwardly in the axial direction. The inclined face 44BA and the inner periphery 18A contact an encircling-member-side air-liquid interface 122 of the lubricant 20 to be discussed later, and configure a capillary seal that prevents the lubricant 20 from spilling out by capillary force. For example, the encircling-member-side air-liquid interface 122 is leveled with or located upwardly of the region where the first dynamic pressure generating groove 50 is disposed in the axial direction. According to such a structure, a larger amount of the lubricant 20 can be retained, thereby reducing the possibility of the occurrence of a failure due to the lack of the lubricant 20. For example, the encircling-member-side air-liquid interface 122 is provided outwardly relative to the third and fourth dynamic pressure generating grooves 54 and 56 in the radial direction.

The ring member 46 is hollow and is in a ring shape, and has an inner periphery 46A, an outer periphery 46B, an upper face 46C, and a lower face 46D. The ring member 46 is formed by, for example, cutting a stainless-steel material like SUS 303 or SUS 430. The ring member 46 has the outer periphery 46B and the lower face 46D fitted in the recess 44E of the cylinder part 44, and is bonded and fixed thereto. The ring member 46 has an inclined face 46AA formed in the inner periphery 46A and reducing the radius as becoming closer to the upper end thereof. A clearance between the inclined face 46AA of the ring member 46 and the tapered face 12AA of the upper flange 12 in the radial direction defines a tapered space gradually expanding as it goes up in the axial direction. The inclined face 46AA of the ring member 46 and the tapered face 12AA of the upper flange 12 contact a flange-side air-liquid interface 124 of the lubricant 20 to be discussed later, and configure a capillary seal that prevents the lubricant 20 from spilling out by capillary force.

The cap 48 is thin in the axial direction and is in a hollow ring shape, and has an inner periphery 48A, an outer periphery 48B, an upper face, and a lower face 48D. The cap 48 is formed by, for example, cutting a stainless-steel material like SUS 303 or SUS 430. The cap 48 may be formed of other metallic materials or resin materials by pressing, molding, etc. The cap 48 has the outer periphery 48B fitted in the recess 26L of the inner periphery 26B of the first annular part 26A of the hub 26, and bonded and joined therewith. Accordingly, the cap 48 rotates together with the bearing body 40. The cap 48 has the lower face 48D that covers the flange-side air-liquid interface 124. The cap 48 has the inner periphery 48A encircling the side face of the raised part 12E of the upper flange 12 in a non-contact manner. The lower face 48D of the cap 48 has an inner periphery facing the flange end face 12D of the upper flange 12 in a non-contact manner in the axial direction. In other words, the cap 48 covers a part of the flange end face 12D of the upper flange 12. The cap 48 has, at the inner periphery side, an inclined portion having a distance from the lower flange 16 in the axial direction which becomes small as becoming closer to the rotational axis R. That is, the inclined portion of the cap 48 is inclined downwardly along the sloped portion 12DA of the flange end face 12D. In other words, the cap 48 has the inner periphery side located at the lower-flange-16 side over the outer periphery side in the axial direction. By employing such a structure, the cap 48 and the upper flange 12 define a labyrinth for the lubricant 20, thereby suppressing a spill-out of the lubricant 20.

The lubricant 20 is continuously present in a clearance between the bearing body 40 and the shaft body 6 from the encircling-member-side air-liquid interface 122 to the flange-side air-liquid interface 124. For example, the lubricant 20 is present in the clearance between the inclined face 44BA and the inner periphery 18A in the radial direction, the clearance between the cylinder part 44 and the lower flange 16 in the axial direction, the clearance between the sleeve 42 and the lower flange 16 in the axial direction, the clearance between the sleeve 42 and the upper rod 10 in the radial direction, the clearance between the upper flange 12 and the sleeve 42 in the axial direction, the clearance between the upper flange 12 and the cylinder part 44 in the radial direction, and the clearance between the tapered face 12AA and the inclined face 46AA in the radial direction. When the bearing body 40 rotates relative to the shaft body 6, the first, second, third, and fourth dynamic pressure generating grooves 50, 52, 54, and 56 respectively generate dynamic pressures to the lubricant 20. The rotating body 4 having the bearing body 40 fixed by such dynamic pressures is supported in the radial direction and axial direction in a non-contact manner with the stationary body 2 having the shaft body 6 fixed.

The bearing body 40 has, in addition to the clearance in the radial direction between the sleeve 42 and the upper rod 10, a passage BP for the lubricant 20 which causes the clearance in the axial direction between the upper flange 12 and the sleeve 42 and the clearance in the axial direction between the sleeve 42 and the lower flange 16 to be in communication with each other. For example, the passage BP may include a passage provided in the sleeve 42 in the axial direction. The passage BP may be provided in the cylinder part 44 instead of the sleeve 42. The passage BP reduces a difference in pressure between the clearance in the axial direction between the upper flange 12 and the sleeve 42 and the clearance in the axial direction between the sleeve 42 and the lower flange 16. This results in the reduction of the possibility that the lubricant 20 leaks out.

Next, with reference to FIG. 3, an explanation will be given of a structure having the top cover 22 joined with the shaft body 6.

The top cover 22 is joined with the upper rod 10 of the shaft body 6 by allowing a fastener to be engaged with the retainer hole 10A. More specifically, the center screw 74 passes all the way through the center hole 22D of the top cover 22, and is engaged with a part of the female screw of the retainer hole 10A of the upper rod 10. The periphery edge of the center hole 22D of the cover recess 22E is held between the flange of the center screw 74 and the upper end face of the upper rod 10, and thus the top cover 22 is fixed to the upper rod 10.

According to the structure having both ends of the shaft body 6 fixed to a chassis including the base 24 and the top cover 22, the shock resistance characteristic, etc., of the rotating device 100 is enhanced.

The upper rod 10 is provided with a gas accumulator 78 that accumulates air in a space between the lower end of the center screw 74 of the retainer hole 10A and the upper end of the lower rod 14 in the axial direction. The gas accumulator 78 is communicated with the passage 14B of the lower rod 14. When the sealant 76 not cured yet is present between the retainer hole 10A and the outer periphery 14A, the sealant 76 is being cured while producing volatile components contained therein. Since the gas accumulator 78 is provided, the volatile components of the sealant 76 are efficiently evacuated to the exterior through the gas accumulator 78 and the passage 14B. As a result, the curing time of the sealant 76 can be short, thereby reducing the work hours. Moreover, when a predetermined time has elapsed after such an assembling work, the passage cover 120 is provided so as to block off the passage 14B. This reduces the possibility of a leak-in of foreign materials into the region where the lubricant 20 is present through the passage 14B, the gas accumulator 78, and the space between the upper rod 10 and the lower rod 14.

Next, an explanation will be given of an example method of manufacturing the rotating device 100.

(1) The sleeve 42 has the outer periphery 42B fixed to the inner periphery 44A of the cylinder part 44 by, for example, press-fitting. Bonding or press-fitting-bonding may be applied instead of press-fitting (see FIG. 4).

(2) The first and second dynamic pressure generating grooves 50 and 52 are provided in the inner periphery 42A of the sleeve 42. The third and fourth dynamic pressure generating grooves 54 and 56 are provided in the upper face 42C of the sleeve 42 and the lower face 42D thereof, respectively.

(3) The sleeve 42 fixed to the cylinder part 44 is held between the upper flange 12 fixed to the upper rod 10 and the lower flange 16 fixed to the lower rod 14, and the lower rod 14 is inserted in the retainer hole 10A of the upper rod 10 up to a predetermined insertion position (see FIG. 4). For example, the lower rod 14 can be inserted in such a way that the male screw 14AB provided on the lower rod 14 is engaged with the female screw 10AB provided in the retainer hole 10A of the upper rod 10. At this time, screwing can be carried out with the sealant 76 being applied to at least either one of the outer periphery 14A of the lower rod 14 and the retainer hole 10A.

(4) In the condition of (3), a dimension P1 of the play in the axial direction of the sleeve 42 between the upper flange 12 and the lower flange 16 is inspected.

(5) The insertion position of the lower rod 14 in the retainer hole 10A of the upper rod 10 is changed depending on a dimension P0 of a desired play of the sleeve 42 in the axial direction and the inspected dimension P1 of the play in the axial direction between the upper flange 12 and the lower flange 16. For example, the insertion position can be changed by a distance corresponding to a difference between P0 and P1. For example, by rotating the male screw 14AB engaged with the female screw 10AB, the insertion position can be changed.

(6) The ring member 46 is fixed to the cylinder part 44 by, for example, press-fitting. Bonding or press-fitting-bonding may be applied instead of press-fitting (see FIG. 4).

(7) An assembly of the shaft body 6 and the bearing body 40 in the condition explained in (6) is left stationary under a high-temperature atmosphere to let the sealant 76 cured, thereby fixing and bonding the lower rod 14 with the upper rod 10. For example, the shaft body 6 and the bearing body 40 are left stationary in a hot bath filled with clean air of 60 to 120° C., for 30 to 120 minutes, thereby letting the sealant 76 cured.

(8) The lubricant 20 is filled in the predetermined space between the bearing body 40 and the shaft body 6. Accordingly, the fluid bearing unit is fabricated (see FIG. 4). For example, the assembly of the shaft body 6 and the bearing body 40 with the sealant 76 being cured is set to a jig under a reduced-pressure atmosphere, a predetermined amount of the lubricant 20 is applied to a portion that will be an open end of the region where the lubricant 20 is present between the shaft body 6 and the bearing body 40, and the atmosphere is subjected to pressure recovery, thereby filling the lubricant 20.

(9) For the fluid bearing unit after the lubricant 20 is filled therein, the position of the air-liquid interface of the filled lubricant 20 is inspected. For example, laser light is emitted to the flange-side air-liquid interface 124 of the lubricant 20 contacting the tapered face 12AA, and the position of the flange-side air-liquid interface 124 can be inspected in accordance with the reflected light. Moreover, laser light is emitted to the sloped portion 12DA, and the position of the sloped portion 12DA may be inspected in accordance with the reflected light. By inspecting the position of the flange-side air-liquid interface 124 and the position of the sloped portion 12DA in this manner, the relative position of the flange-side air-liquid interface 124 to the sloped portion 12DA can be inspected (see FIG. 5). When the position of the flange-side air-liquid interface 124 is out of a predetermined range for the inspected fluid bearing unit, a repair work, etc., may be applied.

(10) The magnet 28 is fixed to the inner periphery 26H of the second annular part 26E of the hub 26 by, for example, bonding (see FIG. 3).

(11) The outer periphery 44B of the cylinder part 44 of the fluid bearing unit having undergone the inspection of (9) is fixed to the inner periphery 26B of the first annular part 26A of the hub 26 by, for example, press-fitting. Bonding or press-fitting-bonding may be applied instead of press-fitting (see FIG. 4).

(12) The cap 48 is fixed in the recess 26L of the first annular part 26A by, for example, press-fitting. Bonding or press-fitting-bonding may be applied instead of press-fitting (see FIG. 4).

(13) The stator core 32 having the coils 30 wound therearound is fixed to the base 24 by, for example, press-fitting. Bonding or press-fitting-bonding may be applied instead of press-fitting (see FIG. 3).

(14) The flange encircling member 18 of the fluid bearing unit is fitted in the opening 24D of the base 24, and is bonded and fixed thereto (see FIG. 4).

(15) The magnetic recording disk 62 is joined with the hub 26 by the clamper 72 (see FIG. 3).

(16) The data reader/writer 60 and other members are attached to the base 24.

(17) By causing the center screw 74 to pass all the way through the center hole 22D and to be engaged with a part of the female screw 10AB of the retainer hole 10A of the upper rod 10, the top cover 22 is joined with the upper rod 10 (see FIG. 3). A sealant may be applied to the flange of the center screw 74.

(18) The top cover 22 is joined with the base 24 by the peripheral screws 104. The rotating device 100 is manufactured through a predetermined inspection and other processes.

The method and process procedures thereof for manufacturing the rotating device 100 are merely examples, and the rotating device 100 can be manufactured by other methods and process procedures.

Next, an explanation will be given of an operation of the rotating device 100 structured as explained above. In order to rotate the magnetic recording disk 62, a drive current of three phases is supplied to the coils 30. When the drive current flows through respective coils 30, field magnetic fluxes are produced along the protrusions of the stator core 32. A mutual effect of such field magnetic fluxes and the magnetic fluxes of the drive magnetic poles of the magnet 28 applies torque to the magnet 28, and thus the hub 26 and the magnetic recording disk 62 engaged therewith rotate. While at the same time, the voice coil motor 66 swings the swing arm 64, and thus the recording/playing head comes and goes within the swinging range over the magnetic recording disk 62. The recording/playing head converts magnetic data recorded in the magnetic recording disk 62 into electric signals, and transmits the electric signals to a control substrate (unillustrated), and writes data transmitted from the control substrate in the form of electric signals on the magnetic recording disk 62 as magnetic data.

The rotating device 100 of this embodiment employing the above-explained structure has following advantages.

When the rotating device 100 receives shock due to falling, the boundary part between the lower rod 14 of the shaft body 6 and the lower flange 16 may be damaged. However, according to the rotating device 100 of this embodiment, the shaft body 6 has the lower rod 14 and the lower flange 16 formed together, and thus the boundary part between the lower rod 14 and the lower flange 16 is withstandable against such shock. Moreover, since the lower rod 14, the lower flange 16, and the flange encircling member 18 are formed together, the labor hours for assembling can be reduced and the work efficiency is improved, and the dimension error among the lower rod 14, the lower flange 16, and the flange encircling member 18 can be reduced.

Moreover, when the upper rod 10 of the shaft body 6 and the upper flange 12 thereof are formed separately and then joined together, the dimension error of the upper rod 10 and the upper flange 12 may increase. According to the rotating device 100 of this embodiment, however, the shaft body 6 has the upper rod 10 and the upper flange 12 formed together, and thus such a dimension error can be suppressed, resulting in an advantage for downsizing and thinning.

When the upper rod 10 of the shaft body 6 and the lower rod 14 thereof are formed together, it becomes difficult to place the sleeve 42 of the bearing body 40 between the upper flange 12 and the lower flange 16. According to the rotating device 100 of this embodiment, however, since the upper rod 10 and the lower rod 14 are separate components, the sleeve 42 can be easily placed therebetween.

Moreover, when the upper rod 10 and the lower rod 14 are simply bonded and fixed together, when shock is applied thereto, the joined portion may be damaged. According to the rotating device 100 of this embodiment, however, the female screw 10AB of the upper rod 10 is engaged with the male screw 14AB of the lower rod 14 to fix the upper rod 10 and the lower rod 14, and thus the joined portion is withstandable against such shock.

When the retainer hole 10A is a sac hole, it may need a large amount of labor work for eliminating the process residues from the sac hole. According to the rotating device 100 of this embodiment, however, the retainer hole 10A is a through-hole, and thus the elimination of the process residues can be facilitated.

When the female screw 10AB of the retainer hole 10A has different diameters and thread pitches at a portion engaged with the center screw 74 and a portion engaged with the male screw 14AB, if those screw portions are processed and machined separately, it needs a large amount of labor work. According to the rotating device 100 of this embodiment, since the diameter and thread pitch of the female screw 10AB are uniform in the axial direction, such a large amount of labor work can be reduced.

According to the rotating device 100 of this embodiment, the lower rod 14 has the small-diameter part 14AC provided between the male screw 14AB and the large-diameter part 14AA, and thus the space around the small-diameter part 14AC serves as a buffer space for retaining the excessive sealant 76 applied to the male screw 14AB or the large-diameter part 14AA, thereby reducing the leakage of the sealant 76.

Furthermore, there is a structure in which the clamper that fastens the magnetic recording disk on the hub is fixed to the upper end face of the hub. According to such a structure, when the dimension of the rotating device in the axial direction is restricted, the hub may be made thin by what corresponds to the clamper. If the hub is made thin, the strength of the thinned portion decreases, and thus such a portion may be damaged when shock is applied thereto. According to the rotating device 100 of this embodiment, however, the clamper 72 is fitted in the circumferential groove 26G of the outer periphery 26F of the hub 26, thereby avoiding the reduction of the strength.

When it is attempted to downsize the rotating device, the adverse effect due to the manufacturing error in the gaps between the shaft body 6 and the bearing body 40 in the radial direction and in the axial direction becomes relatively large. When, for example, the play of the sleeve 42 of the bearing body 40 in the axial direction between the upper flange 12 and the lower flange 16 is small, in the worst case, the gap is too small and thus the sleeve 42 contacts the upper flange 12 or the lower flange 16, which may disrupt the rotation. Conversely, when the play in the axial direction is large, the thrust dynamic pressure becomes small, and thus the rotation may become unstable. According to the rotating device 100 of this embodiment, however, since the insertion position of the lower rod 14 in the retainer hole 10A of the upper rod 10 can be changed after such a play in the axial direction is inspected, such a manufacturing error in the play in the axial direction can be suppressed. That is, by making the dimension in the axial direction of either one of the shaft body and the bearing body changeable, the manufacturing error in the gap between the shaft body and the bearing body in the axial direction can be at least partially canceled.

Moreover, when laser light is emitted to the flange-side air-liquid interface 124 from a light source, in order to avoid the ring member 46 and the upper flange 12, it is typical to emit laser light at an angle parallel to the tapered face 12AA of the upper flange 12. Conversely, when the position of the sloped portion 12DA is inspected, laser light is emitted at an irradiation angle orthogonal to the sloped portion 12DA. When those laser lights have different irradiation angles, it is typical to use another light source different from the light source for the flange-side air-liquid interface 124. According to the rotating device 100 of this embodiment, however, the angle $\theta s$ between the straight line 132 orthogonal to the sloped portion 12DA and the straight line 134 parallel to the rotational axis R is substantially equal to the angle $\theta t$ between the straight line 136 along the tapered face 12AA and the straight line 138 parallel to the rotational axis R (see FIG. 5). Accordingly, the laser light emitted to the air-liquid interface 124 and the laser light emitted to the sloped portion 12DA can have substantially same irradiation angle. By employing such a structure, when the position of the sloped portion 12DA is inspected, laser light can be emitted to the sloped portion 12DA along the straight line 132 from a laser light source 130 placed at a position A, and when the position of the air-liquid interface 124 is inspected, laser light can be emitted to the air-liquid interface 124 along the straight line 136 from a laser light source 130' placed at a position B. That is, when $\theta t$ and $\theta s$ are substantially equal to each other, the light source 130 and the light source 130' can be realized by the common light source moved in the radial direction between the position A and the position B. In this case, it is sufficient when there is only one light source for inspecting those positions, the inspection device can be made downsized.

A feature of such technical thought can be expressed as follows. That is, when the relative position of the air-liquid interface is inspected with reference to the position of the predetermined portion of the rotating device, the passage of the laser light emitted to inspect the position of the air-liquid interface is substantially parallel with the passage of the laser light emitted to inspect the position of the predetermined portion. For example, the relative position of the air-liquid interface 124 can be inspected with reference to the position of the upper face 46C of the ring member 46 of the bearing body 40. In this case, a sloped portion which decreases a distance from the lower flange 16 in the axial direction as becoming close to the rotational axis R may be provided at the upper face 46C of the ring member 46.

The explanation was given of the structure and the operation of the rotating device according to the embodiment of the present invention, but the embodiment explained above is merely to illustrate the present invention, and it should be understood by those skilled in the art that the combination of respective structural elements permits various modifications, and such modifications are within the scope and spirit of the present invention.

According to the embodiment, the explanation was given of the case in which the lower shaft member is directly attached to the base, but the present invention is not limited to this case. For example, a brushless motor including a rotating body and a stationary body may be separately formed, and such a brushless motor may be attached to a chassis.

According to the embodiment, although the explanation was given of the case in which the stator core is encircled by the magnet, the present invention is not limited to this case. For example, the magnet may be encircled by the stator core.

What is claimed is:

1. A rotating device comprising:
    a shaft body comprising a lower rod and an upper rod formed with a retainer hole which encircles a part of the lower rod and which fastens the lower rod;
    a bearing body comprising a shaft encircling member that encircles the shaft body and being freely rotatable relative to the shaft body;
    a radial dynamic pressure generating groove which is provided in either one of the shaft body and the bearing body and which generates dynamic pressure in a radial direction;
    a thrust dynamic pressure generating groove which is provided in either one of the shaft body and the bearing body and which generates dynamic pressure in a thrust direction; and
    a lubrication medium present in a gap between the shaft body and the bearing body,
    wherein a sealant is present in a space between the lower rod and the upper rod in the radial direction.

2. The rotating device according to claim 1, wherein the lower rod is joined with the upper rod by a male screw which is provided on the lower rod and is engaged with a female screw provided in the retainer hole of the upper rod.

3. The rotating device according to claim 2, wherein the lower rod comprises:
    the male screw provided on an outer periphery of the lower rod;
    a small-diameter part with a smaller diameter than a diameter of the male screw; and
    a large-diameter part with a larger diameter than the diameter of the male screw, and
    wherein the male screw, the small-diameter part, and the large-diameter part are arranged in this order in an axial direction.

4. The rotating device according to claim 1, wherein the retainer hole is a through-hole passing all the way through the upper rod in an axial direction.

5. The rotating device according to claim 4, further comprising:
    a base that fixes the lower rod; and
    a top cover fixed to the base,
    wherein the top cover is formed with an opening and is joined with the upper rod by a fastener which is engaged with the retainer hole via the opening.

6. The rotating device according to claim 5, wherein an outer diameter of the male screw of the lower rod is substantially the same as an outer diameter of a portion of the fastener engaged with the retainer hole.

7. The rotating device according to claim 1, wherein the shaft body further comprises:
    a lower flange which extends outwardly in the radial direction from a side face of a portion of the lower rod near an end; and
    an upper flange which extends outwardly in the radial direction from a side face of a portion of the upper rod distant from the lower flange in an axial direction, and
    wherein the shaft encircling member is present in a space between the lower flange and the upper flange in the axial direction.

8. The rotating device according to claim 7, wherein the upper flange is unified with the upper rod.

9. The rotating device according to claim 7, wherein the lower flange is unified with the lower rod.

10. The rotating device according to claim 7, wherein:
    the bearing body further comprises a ring member which encircles the upper flange and which is fixed to the shaft encircling member,
    a gap between an inner periphery of the ring member and an outer periphery of the upper flange in the radial direction widens toward an opposite side to the lower flange in the axial direction, and
    when the lubrication medium is a liquid, the lubricant medium comprises a flange-side air-liquid interface that contacts the outer periphery of the upper flange and the inner periphery of the ring member.

11. The rotating device according to claim 10, wherein the upper flange comprises a sloped portion provided at an end face of the upper flange opposite to the lower flange and inclined from an outer periphery side to an inner periphery side toward the lower flange.

12. The rotating device according to claim 11, further comprising a cover which rotates together with the bearing body and which covers a part of the sloped portion of the upper flange,
    wherein the cover has an inner periphery located at the lower-flange side over an outer periphery in the axial direction.

13. The rotating device according to claim 10, further comprising a flange encircling member which extends from an outer periphery of the lower flange toward the upper flange in the axial direction, is unified with the lower flange, and encircles the shaft encircling member via a gap, wherein:
    a gap between an inner periphery of the flange encircling member and an outer periphery of the shaft encircling member in the radial direction gradually widens toward the upper flange in the axial direction, and
    the lubrication medium comprises an encircling-member-side air-liquid interface that contacts the inner periphery of the flange encircling member and the outer periphery of the shaft encircling member.

14. The rotating device according to claim 1, further comprising a hub which includes a protruding part engageable with a center hole of a recording disk, and a mount part provided outwardly from the protruding part in the radial direction, the hub being fixed to the bearing body, wherein:
    a clamper catcher is formed in an outer periphery of the protruding part, and
    the recording disk is fixed to the hub by being held between a clamper engaged with the clamper catcher and the mount part.

15. A method for manufacturing a rotating device, the rotating device comprising:
    a shaft body comprising a lower rod, a lower flange extending outwardly in a radial direction from a side face of the lower rod at one end side, an upper rod formed with a retainer hole encircling a part of the lower rod and fixing the lower rod, and an upper flange extending outwardly in the radial direction from a side face of the upper rod at a side distant from the lower flange in an axial direction;

a bearing body comprising a shaft encircling member which is present in a space between the lower flange and the upper flange in the axial direction, encircles the shaft body, and is freely rotatable relative to the shaft body;

a radial dynamic pressure generating groove which is provided in either one of the shaft body and the bearing body and which generates dynamic pressure in the radial direction;

a thrust dynamic pressure generating groove which is provided in either one of the shaft body and the bearing body and which generates dynamic pressure in a thrust direction; and a lubrication medium present in a gap between the shaft body and the bearing body, the method comprising:

inspecting a dimension of a play of the shaft encircling member between the upper flange and the lower flange in the axial direction with the shaft encircling member being placed between the upper flange fixed to the upper rod and the lower flange fixed to the lower rod, and the lower rod being inserted in the retainer hole of the upper rod up to a predetermined insertion position;

changing the insertion position of the lower rod in the retainer hole of the upper rod in accordance with a desired dimension of a play of the shaft encircling member in the axial direction between the upper flange and the lower flange and the inspected dimension of the play in the axial direction; and fixing the lower rod to the upper rod with the insertion position of the lower rod in the retainer hole being changed.

16. A method for manufacturing a rotating device, the rotating device comprising:

a shaft body comprising a lower rod, a lower flange extending outwardly in a radial direction from a side face of the lower rod at one end side, an upper rod formed with a retainer hole encircling a part of the lower rod and fixing the lower rod, and an upper flange extending outwardly in the radial direction from a side face of the upper rod at a side distant from the lower flange in an axial direction;

a bearing body comprising a shaft encircling member which is present in a space between the lower flange and the upper flange in the axial direction, encircles the shaft body, and is freely rotatable relative to the shaft body;

a radial dynamic pressure generating groove which is provided in either one of the shaft body and the bearing body and which generates dynamic pressure in the radial direction;

a thrust dynamic pressure generating groove which is provided in either one of the shaft body and the bearing body and which generates dynamic pressure in a thrust direction; and a lubrication medium present in a gap between the shaft body and the bearing body, the upper flange comprising a tapered face which is provided at an outer periphery side face, increases a diameter toward the lower flange, and contacts an air-liquid interface of the lubrication medium, a sloped portion being provided at an end face of the upper flange opposite to the lower flange and inclining from an outer periphery side to an inner periphery side toward the lower flange, the method comprising:

inspecting a position of the sloped portion by emitting laser light to the sloped portion; and inspecting a position of the air-liquid interface by emitting laser light to the air-liquid interface.

17. A rotating device comprising:

a shaft body comprising a first rod and a second rod formed with a retainer hole which encircles a part of the first rod and which fastens the first rod;

a bearing body comprising a shaft encircling member that encircles the shaft body and being freely rotatable relative to the shaft body;

a radial dynamic pressure generating groove which is provided in either one of the shaft body and the bearing body and which generates dynamic pressure in a radial direction; and a thrust dynamic pressure generating groove which is provided in either one of the shaft body and the bearing body and which generates dynamic pressure in a thrust direction, wherein a sealant is present in a space between the first rod and the second rod in the radial direction.

18. The rotating device according to claim 17, wherein the shaft body further comprises:

a first flange which extends outwardly in the radial direction from a side face of a portion of the first rod near an end; and a second flange which extends outwardly in the radial direction from a side face of a portion of the second rod distant from the first flange in an axial direction, and wherein the shaft encircling member is present in a space between the first flange and the second flange in the axial direction.

19. The rotating device according to claim 18, wherein the second flange is unified with the second rod.

20. The rotating device according to claim 18, wherein the first flange is unified with the first rod.

* * * * *